(12) United States Patent
Watanabe et al.

(10) Patent No.: US 7,082,264 B2
(45) Date of Patent: Jul. 25, 2006

(54) SYSTEM COMPRISING CAMERA AND WATERPROOF HOUSING

(75) Inventors: Shinichi Watanabe, Kawaguchi (JP); Koji Funahashi, Tokorozawa (JP)

(73) Assignee: Olympus Corporation, Tokyo (JP)

(*) Notice: Subject to any disclaimer, the term of this patent is extended or adjusted under 35 U.S.C. 154(b) by 108 days.

(21) Appl. No.: 10/886,908

(22) Filed: Jul. 8, 2004

(65) Prior Publication Data

US 2006/0008261 A1    Jan. 12, 2006

(51) Int. Cl.
*G03B 17/08* (2006.01)
*G03B 15/03* (2006.01)

(52) U.S. Cl. .......................... 396/28; 396/177
(58) Field of Classification Search ............ 396/25–29, 396/177–178; 348/81
See application file for complete search history.

(56) References Cited

U.S. PATENT DOCUMENTS

| | | | |
|---|---|---|---|
| 4,653,883 A * | 3/1987 | Maeno ..................... | 396/28 |
| 4,763,145 A * | 8/1988 | Takamura et al. ............ | 396/26 |
| 5,758,200 A * | 5/1998 | Inoue et al. .................. | 396/25 |
| 6,574,434 B1 * | 6/2003 | Matsuoto et al. ............. | 396/29 |

* cited by examiner

*Primary Examiner*—W. B. Perkey
*Assistant Examiner*—Rishi Suthar
(74) *Attorney, Agent, or Firm*—Straub & Pokotylo; John C. Pokotylo

(57) ABSTRACT

A system has a camera and a waterproof housing. The camera has a strobe light-emitting portion which is rotated to the pop-up position for light emission and to the restoring position for non light-emission position and a light-emission preparing member which moves the strobe light-emitting portion from the restoring position to the pop-up position. The waterproof housing can be closed and opened and watertightly stores the camera. Further, the waterproof housing has an operating member which can externally be operated and a press member. In the waterproof housing, the light-emission preparing member on the camera is pressed by pressing the operating member and the strobe light-emitting portion at the restoring position is moved to the pop-up position. The rear portion of the strobe light-emitting portion at the pop-up position is pressed by pressing the press member, thus to move the strobe light-emitting portion to the restoring position.

18 Claims, 8 Drawing Sheets

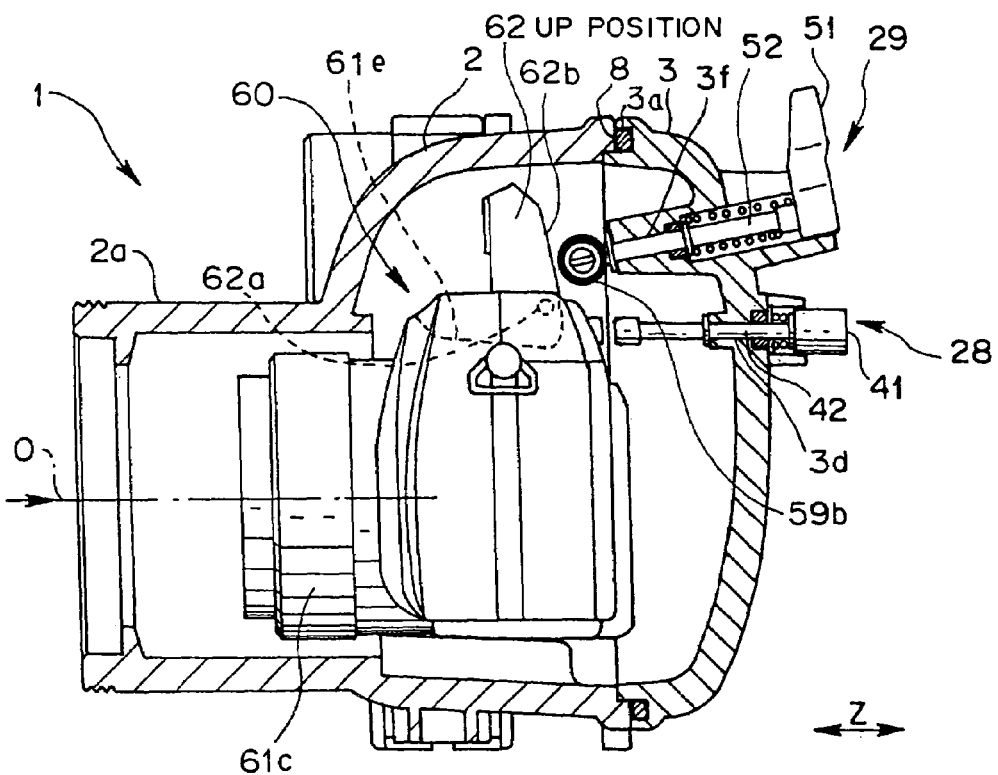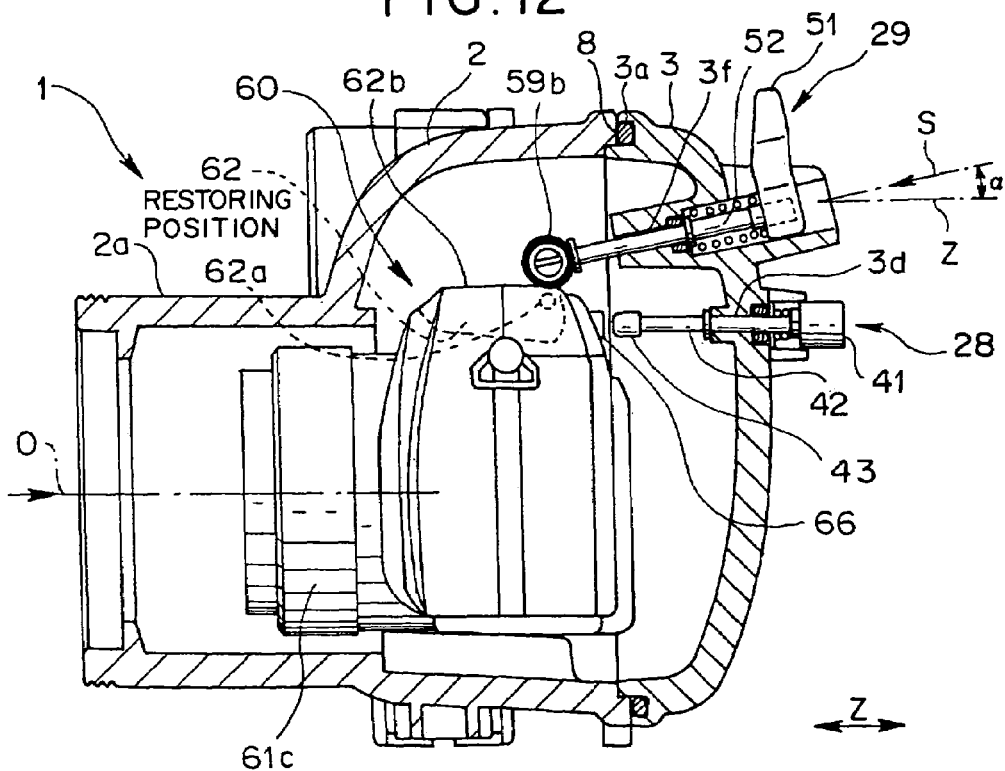

SYSTEM COMPRISING CAMERA AND WATERPROOF HOUSING

BACKGROUND OF THE INVENTION

1. Field of the Invention

The present invention relates to a system having a camera with a strobe light-emitting portion and a waterproof housing capable of storing the camera and of moving the strobe light-emitting portion of the camera.

2. Description of the Related Art

Conventionally, a waterproof housing for camera storage has been produced on a commercial basis for the purpose of underwater photography. The waterproof housing includes two case members which are supported to be opened and closed by a hinge. When the camera is attached to the waterproof housing, the two case members are closed and sealed so as to store the camera. In the camera storing state, the camera is variously operated from the outside of the waterproof housing.

In the above-mentioned waterproof housing for camera storage, a waterproof housing might store the camera having the strobe light-emitting portion. However, few conventional waterproof housings can externally pop up or pop down the strobe light-emitting portion if needed.

SUMMARY OF THE INVENTION

The present invention provides a system comprising a camera and a waterproof housing, in which the waterproof housing stores the camera and the camera comprises a strobe light-emitting portion which can externally be operated.

According to one aspect of the present invention, a system comprises a camera and a waterproof housing. The camera comprises a strobe light-emitting portion which is rotated to the light-emitting position and the non light-emitting position. The waterproof housing comprises a press member which can store the camera and presses the strobe light-emitting portion so that the strobe light-emitting portion is located from the light-emitting position to the non light-emitting position.

Further, according to another aspect of the present invention, a waterproof housing comprises: a waterproof housing case member which can store a camera having a strobe light-emitting portion that is rotated to the light-emitting position and the non light-emitting position; and a press member which presses the strobe light-emitting portion from the rear portion so as to locate the strobe light-emitting portion from the light-emitting position to the non light-emitting position.

Other features and advantages of the present invention will be obvious by the following.

BRIEF DESCRIPTION OF THE DRAWINGS

FIG. 11 is a longitudinal cross-sectional view showing the waterproof housing shown in FIG. 1 in which the strobe light-emitting portion is popped up;

FIG. 12 is a longitudinal cross-sectional view showing the waterproof housing shown in FIG. 1 in which the strobe light-emitting portion is stored;

DESCRIPTION OF THE PREFERRED EMBODIMENTS

Hereinbelow, an embodiment of the present invention will be described with reference to the drawings.

A waterproof housing 1 according to the embodiment of the present invention stores a camera. When the waterproof housing 1 stores the camera, the camera can photograph and reproduce an image underwater. Referring to FIGS. 1 to 4, operating members of the camera are externally exposed. A camera 60 shown in FIG. 5 can be stored in the waterproof housing 1. A system comprising a waterproof housing/camera is structured by the camera 60 and the waterproof housing 1 according to the embodiment.

Hereinafter, an optical axis O denotes a photographing lens optical axis of the stored camera, and a Z-direction denotes the direction in parallel with the optical axis O of the camera stored in the waterproof housing 1.

First, a description is given of the camera 60 which incorporates a strobe light-emitting portion, which can be stored in the waterproof housing 1.

Figure 5:
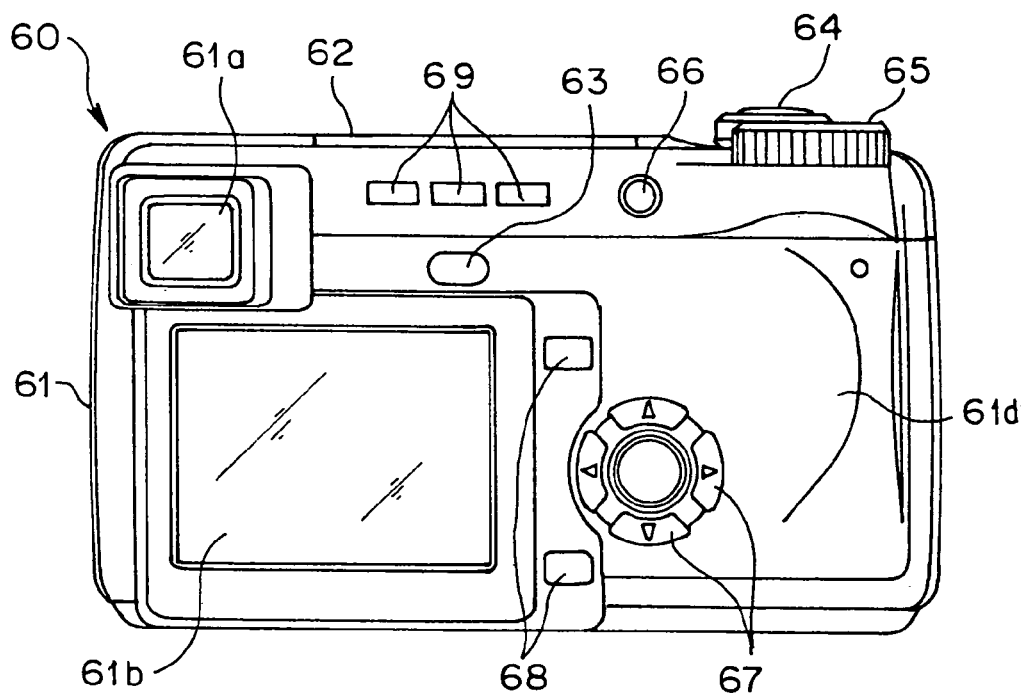
FIG. 5 is a rear view showing a camera which can be stored in the waterproof housing shown in FIG. 1.

Referring to FIG. 5, the camera 60 comprises a lens barrel portion 61c which incorporates a photographing lens at an exterior front portion (refer to FIG. 11). Further, the camera 60 comprises: a zoom button/release button 64 and a mode selecting dial 65 near the right side of an exterior top portion; and a strobe light-emitting portion 62 which is rotatably supported and can be popped up, in the center of the exterior top portion. In addition, the camera 60 comprises on the rear portion: a finder window 61a on the upper left side; and a LCD display portion 61b near the left side. On the top of the rear portion, the camera 60 further comprises mode selecting buttons 69, e.g., a self-timer button and a forced strobe light-emitting button, and a pop-up button 66, as a light-emission preparing member, which pops up the strobe light-emitting portion 62. In the center of the rear portion, the camera 60 further comprises a power switch button 63 which switches on/off a power switch that can be pressed to the top of the LCD display portion 61b. In the center of the rear portion, the camera 60 further comprises: a selecting cross key 67; and mode setting buttons 68 which sets, e.g., quick view. On the right side of the rear portion, the camera 60 comprises a grip portion 61d.

Figure 6:
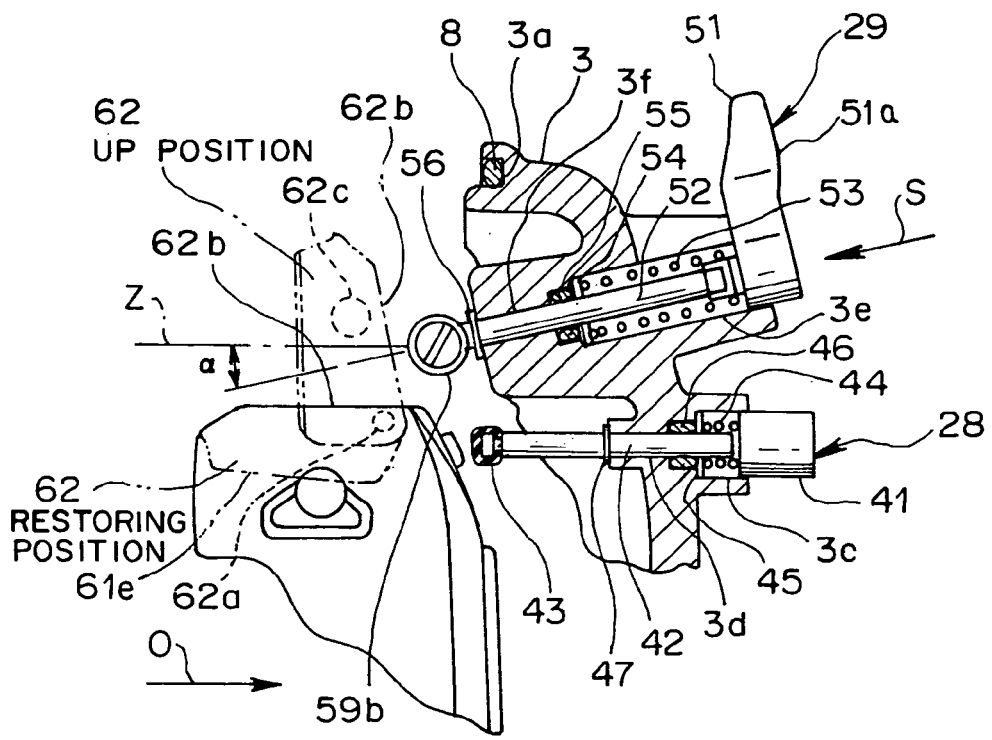
FIG. 6 is a partially longitudinal cross-sectional view showing the operating portion of a strobe light-emitting portion in the waterproof housing shown in FIG. 1.

Referring to FIGS. 6, 11, and 12, in the strobe light-emitting portion 62, a strobe main body for holding a light-emitting tube 62c is rotatably supported at the restoring position (non light-emitting position in FIG. 12) and the pop-up position (light-emitting position in FIG. 11) by a rotating shaft 62a of a camera main body. A rear portion 62b of the strobe main body is substantially along the Z-direction when it is at the restoring position. The strobe main body is energized by a spring in the direction of the pop-up position and is rotated to the standing pop-up position by releasing a stop member (not shown) in conjunction with the press operation of the pop-up button 66. Further, the rear portion 62b is pressed at the pop-up position, thereby throwing down the strobe light-emitting portion 62 to the restoring position in a strobe storing portion 61e (refer to FIGS. 6 and 11) of the camera main body. Then, the strobe light-emitting portion 62 is stopped by the stop member and is held at the restoring position.

Referring to FIGS. 1 to 4, the waterproof housing 1 comprises a front case 2 and a rear case 3, as waterproof hosing case members, which are made from a transparent resin and are supported by hinge shaft members 4 and 5 arranged on the right surface so as to be opened and closed and be rotated. The front case 2 and the rear case 3 store the camera 60 and are closed with buckles 6 and 7 arranged on the left surface to be sealed. In the sealing state, the front case 2 and the rear case 3 are adhered thereto via a ring packing 8 to which a rear case groove 3a is attached on the junction surface so as to keep the watertight state without any space.

At the inner circumference, the front case 2 has ribs 2d and 2e which hold outer-shape portions on the top, bottom, right, and left sides of the stored camera 60. Further, the front case 2 and the rear case 3 comprise a plurality of projections (not shown) fixedly having rubbers at the edge portion projected in the Z-direction so as to fix the optical axis O direction of the stored camera 60. In the camera storing state, the camera 60 is supported firmly by the ribs 2d and 2e and the projections.

Figure 3:
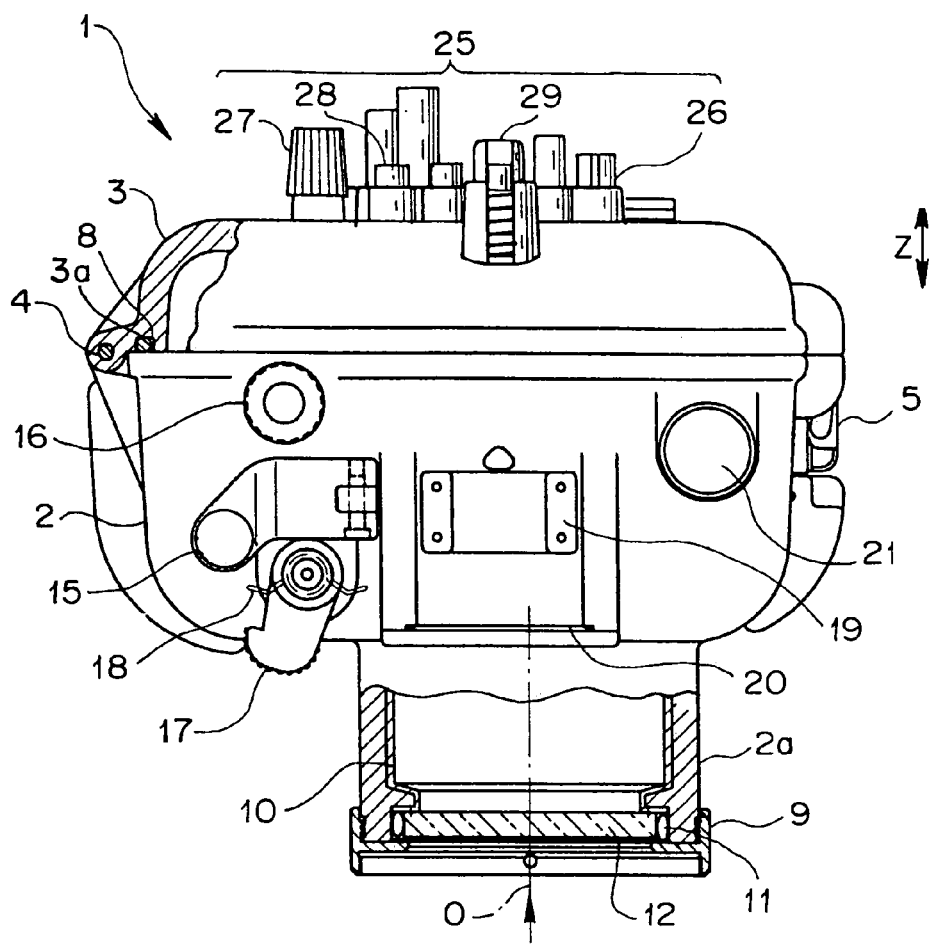
FIG. 3 is a plan view showing the waterproof housing shown in FIG. 1.

In front of the front case 2, a strobe window portion is arranged so as to attach and detach a diffusion plate 20 and a cylindrical portion 2a (FIG. 11) into which the lens barrel portion 61c of the camera 60 is inserted. Referring to FIG. 3, a cylindrical shading rubber member 10 is attached to the cylindrical portion 2a along the inner circumference and a protecting glass 12 shielded and held by an O-ring 11 is attached to the front opening of the front case 2. Further, an attachment ring 9 is fixed to the front end portion of the front case 2.

Figure 1:
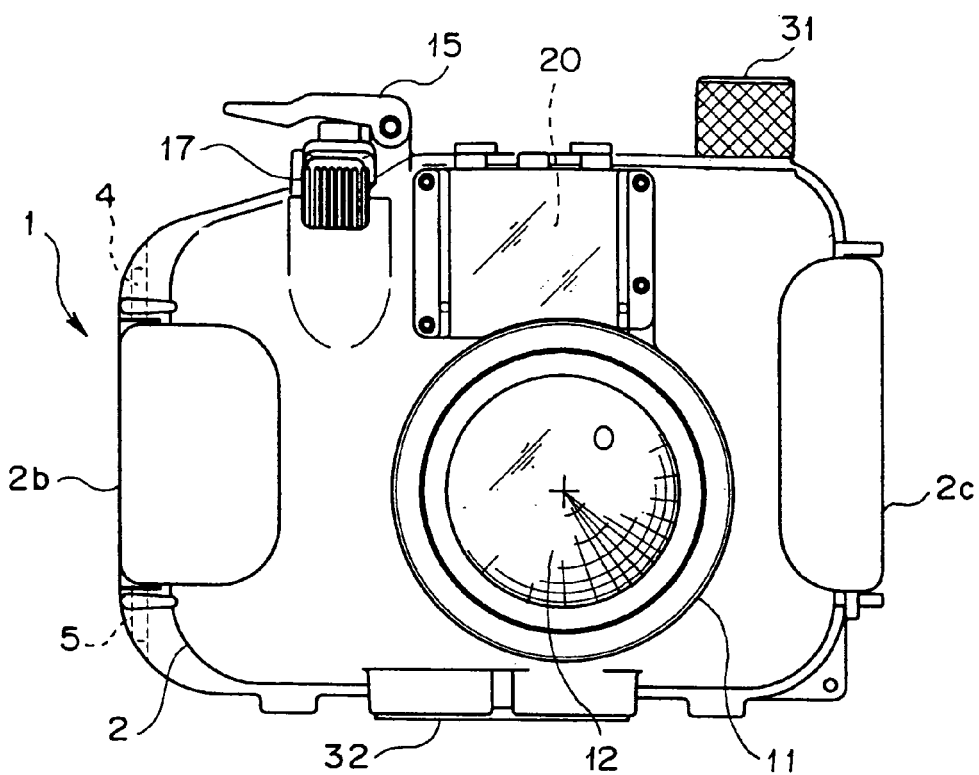
FIG. 1 is a front view showing a waterproof housing according to an embodiment of the present invention.
Figure 2:
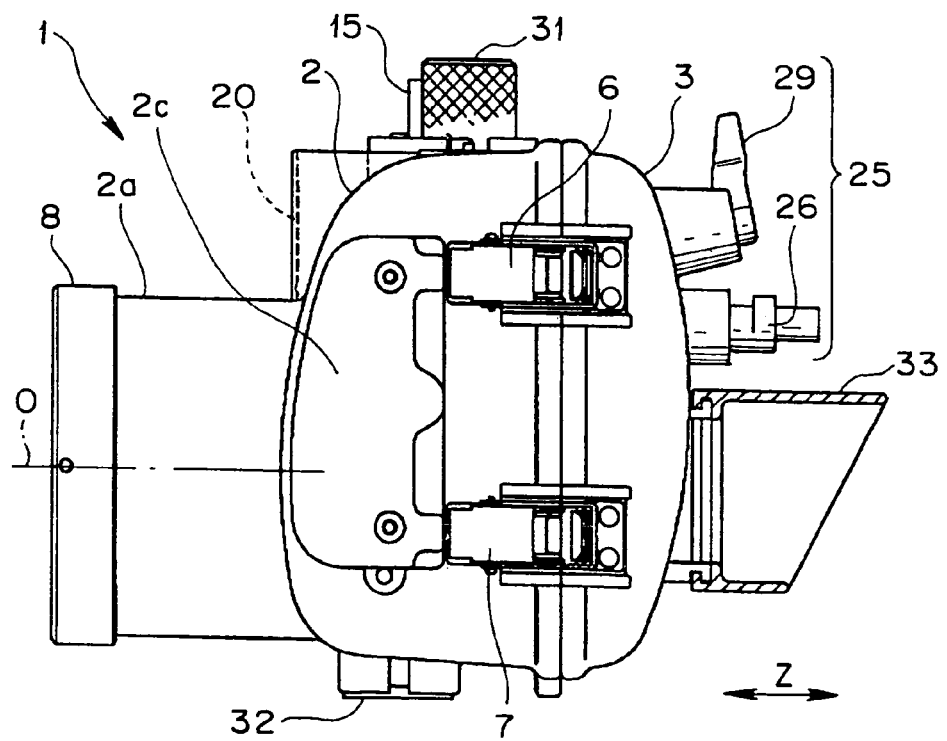
FIG. 2 is a right side view showing the waterproof housing shown in FIG. 1.

Referring to FIGS. 2 and 3, the top surface portion of the front case 2 comprises: a release lever 15 and a zoom lever 17 having a return spring 18 in accordance with the zoom button/release button 64 on the camera side; a mode selection operating member 16 in accordance with a mode selecting dial 65 on the camera side on the camera side; a cap member 21 of a connecting terminal for an external strobe; and an external strobe shoe 19.

Further, grip members 2c and 2d are fixed on the right and left sides of the front case 2. A plate 32 for tripod screw is fixed to the bottom portion of the front case 2.

Figure 4:
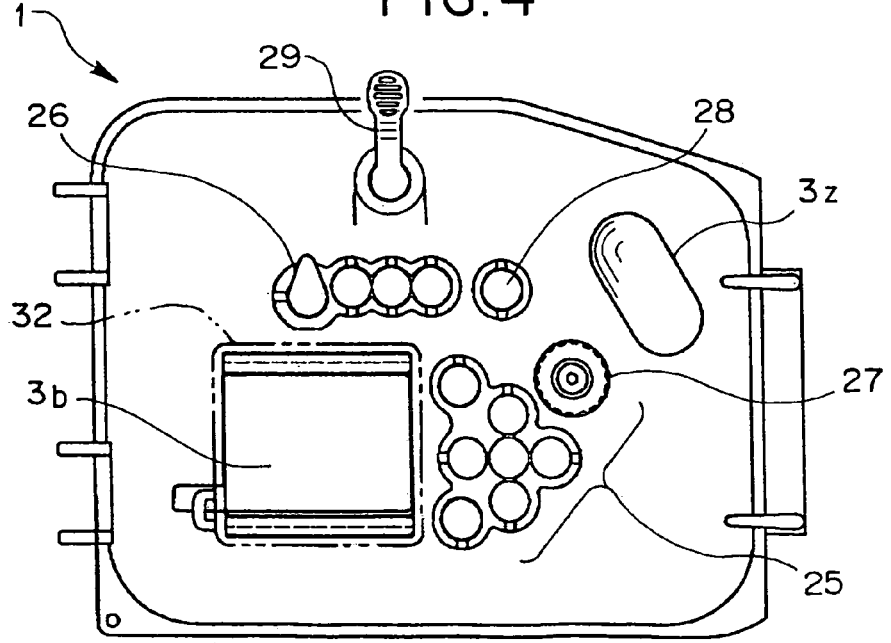
FIG. 4 is a diagram showing an operating portion which is arranged on the rear side of the waterproof housing shown in FIG. 1.

Referring to FIG. 4, the rear case 3 comprises, on the rear portion, a display window portion 3b to which a hood 33 can be attached at the position facing the LCD display portion 61b on the camera side. Further, the rear case 3 comprises, on the rear portion, operating members 25 at positions facing operating buttons of the camera 60. Furthermore, the rear case 3 comprises, on the right side of the rear portion, a caved grip portion 3z.

The above-mentioned operating members 25 attached to the front case 2 and the rear case 3 pierces to be rotated or be slid therein. Sealing O-rings are fit into the rotating portions or sliding portions of the front case 2 and the rear case 3 so as to keep the sealing (watertight) state.

Among the operating members 25, power switch operating members 26 and 27 execute the on/off operation of operating buttons or knobs of the power switch having varied specifications of the camera 60.

Further, among the operating members 25, a pop-up member 28 as the operating member pushes a pop-up button 66 on the camera side and moves the strobe light-emitting portion 62 to the pop-up position (in other words, light-emitting position). Furthermore, among the operating members 25, a restoring member 29 of the light-emitting portion as press means presses the rear portion 62b of the strobe light-emitting portion 62 from the rear side and returns it to the restoring position (non light-emitting position).

Referring to FIG. 6, the pop-up member 28 comprises: a press button 41; a rod 42; an edge rubber member 43; a return spring 44; and a stop ring 47.

The press button 41 is integrated with the rod 42 by inserting and shaping the rod 42. The return spring 44 which energizes the buttons in the releasing direction is inserted and then the rod 42 integral with the press button 41 is inserted from an opening 3c. Further, the rod 42 integral with the press button 41 is piercing through and attached to a through hole 3d along the Z-direction. A circular caved portion is arranged to the bottom of the opening 3c in the piercing state. A sealing O-ring 46 is inserted into the circular caved portion and is fit into the outer circumference of the rod 42 while the O-ring 46 is pressed by a press washer 45. The rod 42 is slidably supported in the shaft direction while a gap between the rod 42 and the through hole 3d is sealed (watertightened) by the O-ring 46. A stop ring 47 is attached at the contact position of the end surface of the through hole 3d of the rod 42. The releasing position of the press button 41 is determined depending on the stop ring 47 in a state in which the energizing force of the return spring 44 is applied. The edge rubber member 43 is fixed to the inner edge portion of the rod 42. The pop-up button 66 on the camera side faces the front side of the edge rubber member 43 in a state in which the camera 60 is stored. The press button 41 is pressed, thereby pressing the pop-up button 66 on the camera side.

Figure 7:
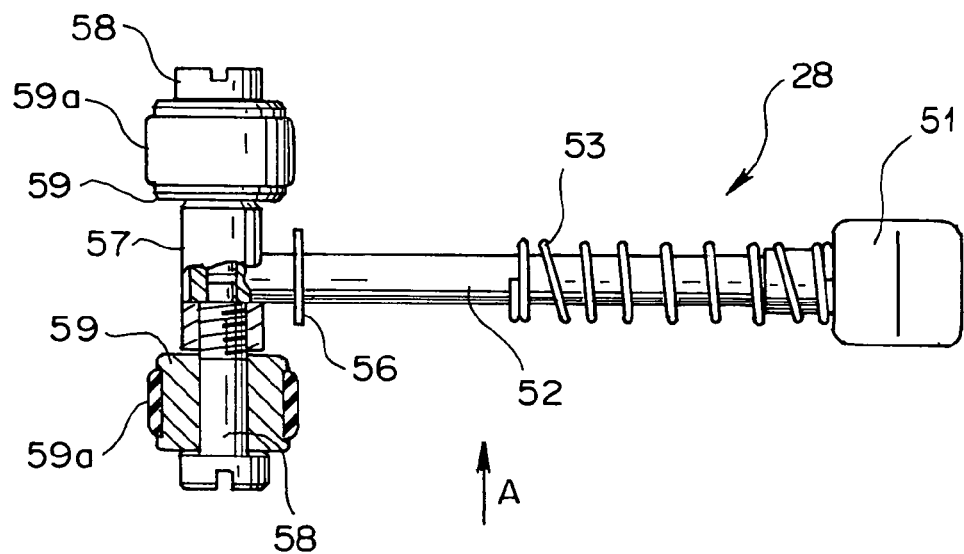
FIG. 7 is a plan view showing a press portion of the strobe light-emitting portion in the operating portions of the strobe light-emitting portion shown in FIG. 1.
Figure 8:
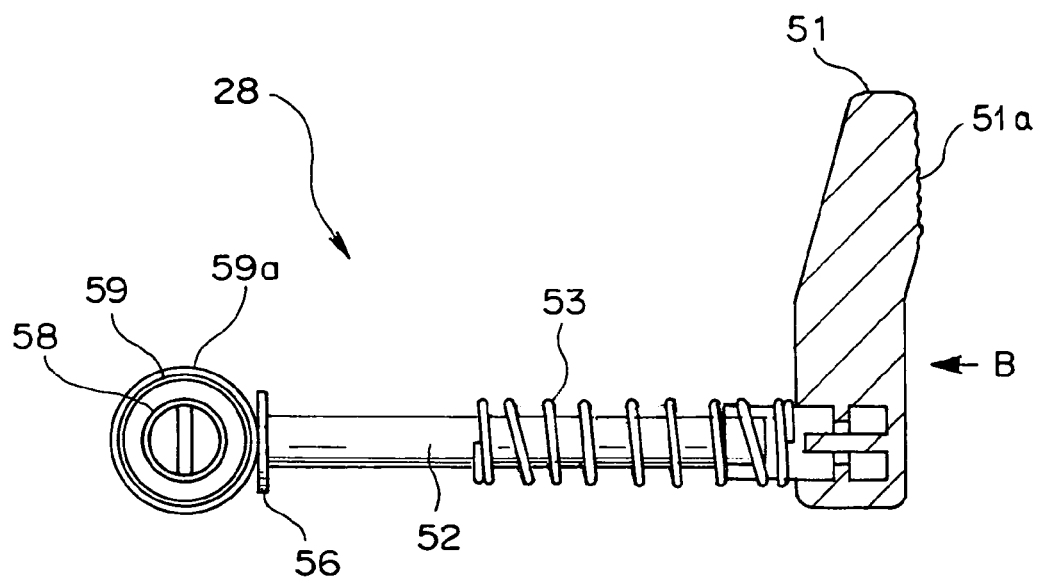
FIG. 8 is a diagram shown by an A arrow in FIG. 7.
Figure 9:
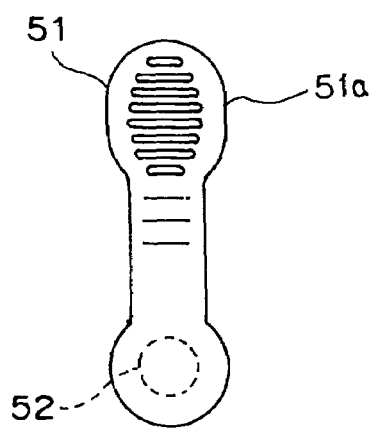
FIG. 9 is a diagram shown by a B arrow in FIG. 8.
Figure 10:
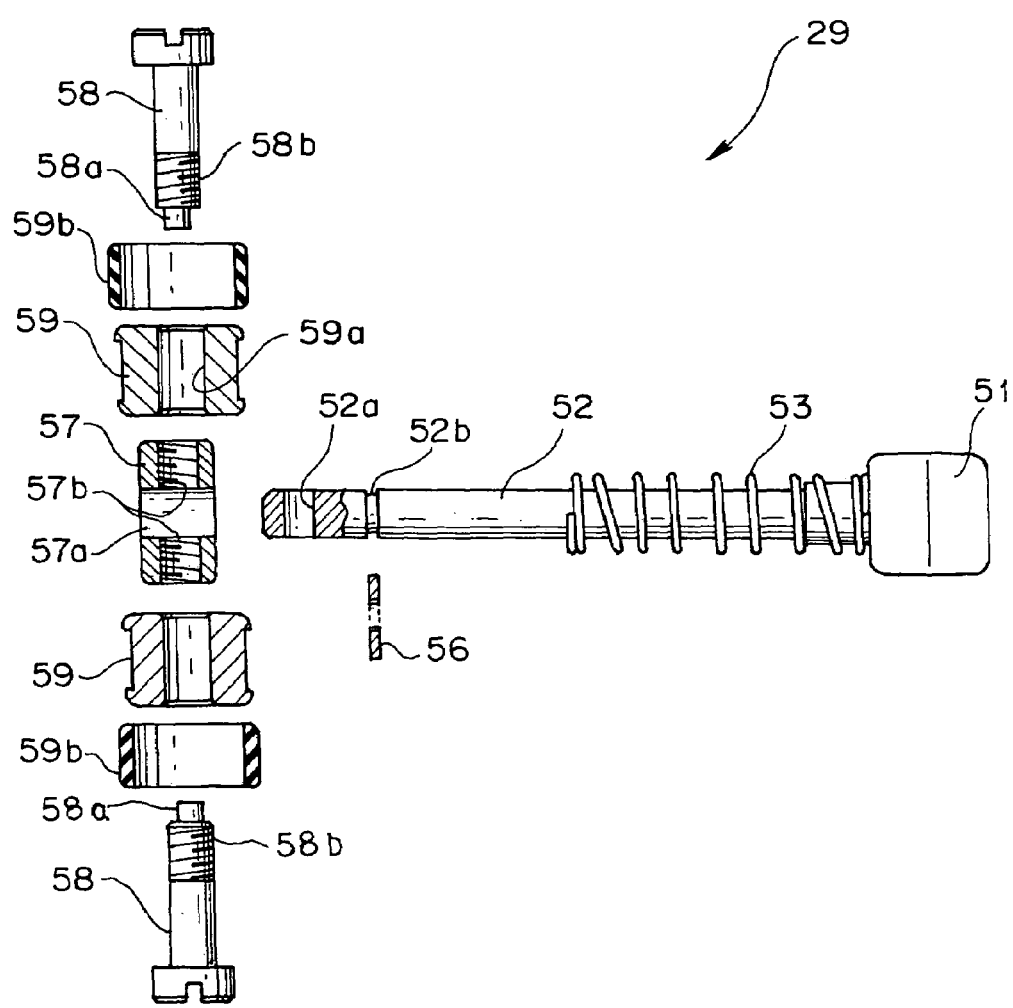
FIG. 10 is an exploded perspective view showing the press portion of the strobe light-emitting portion shown in FIG. 7.
Figure 13:
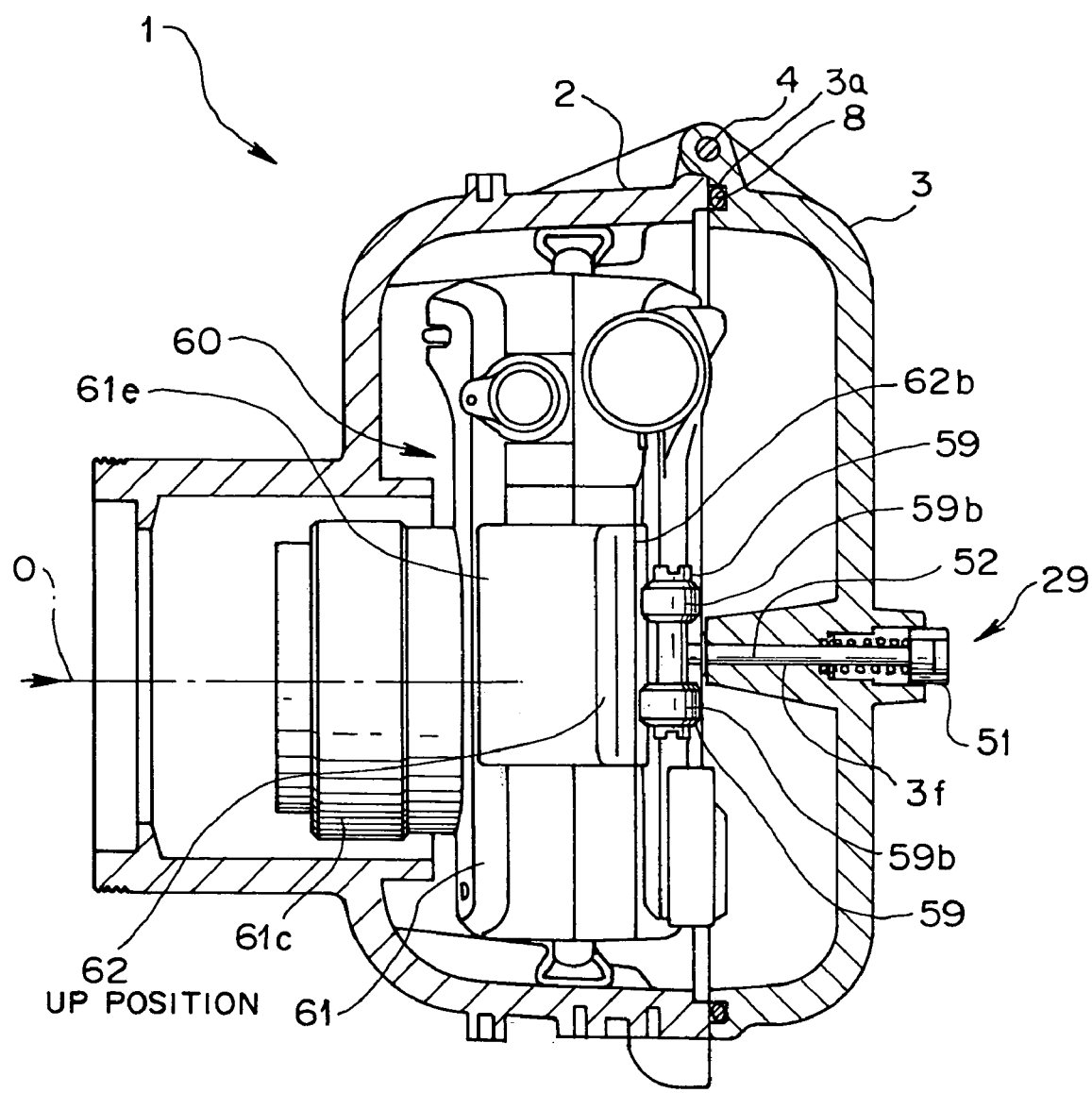
FIG. 13 is a lateral cross-sectional view showing the waterproof housing shown in FIG. 1 in which the strobe light-emitting portion is popped up.
Figure 14:
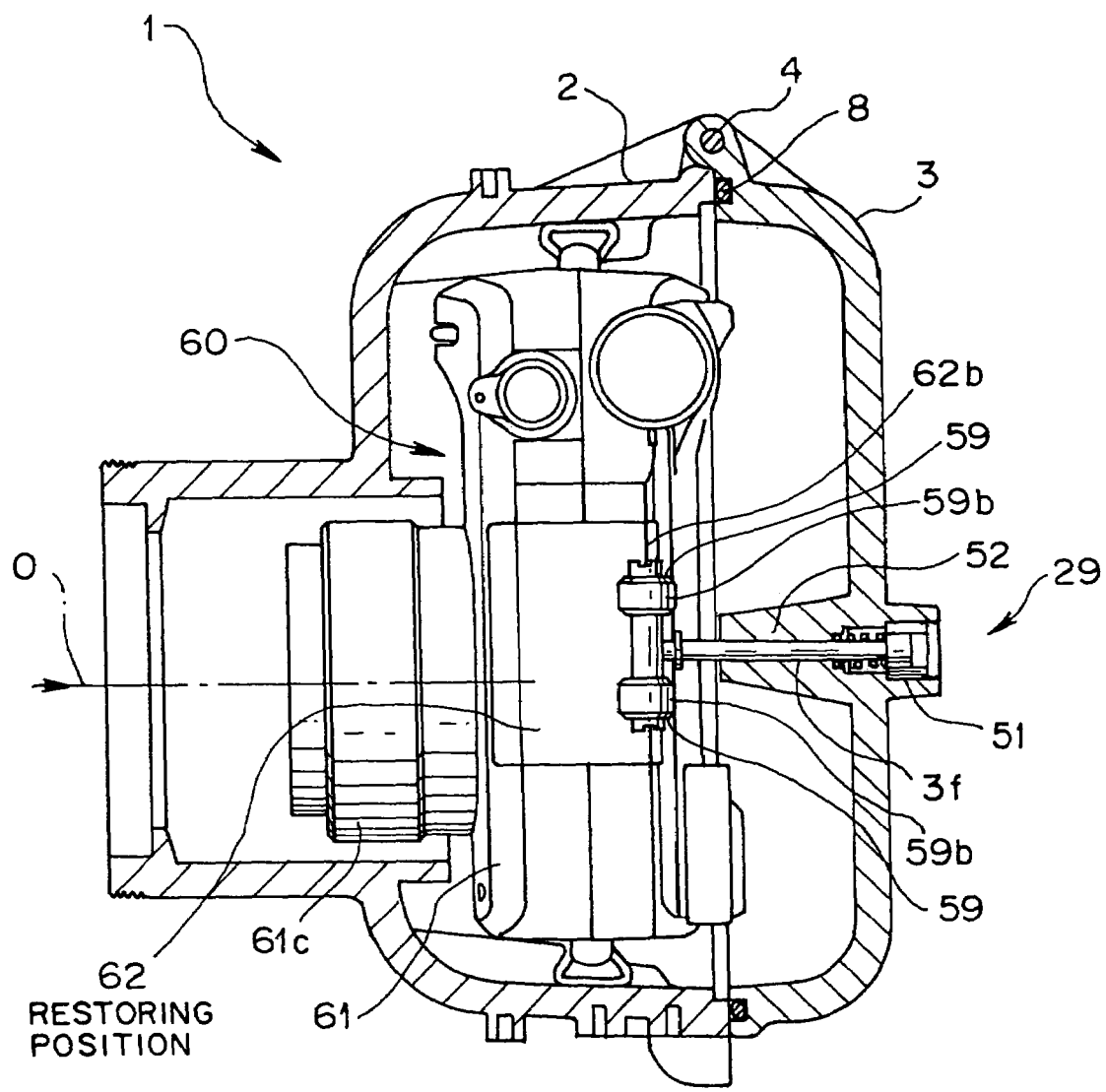
FIG. 14 is a lateral cross-sectional view showing the waterproof housing shown in FIG. 1 in which the strobe light-emitting portion is stored.

Referring to FIGS. 6, 7, and 10, the restoring member 29 of the light-emitting portion comprises: a press button 51; a rod 52 having circular cross-sections (e.g., circular stick-shaped); a return spring 53; a stop ring 56; a screw shaft support 57; a pair of screw shafts 58; a pair of metallic rollers 59; and rubber rollers 59a attached to the outer circumference of the rollers 59.

The press button 51 is integrated with the rod 52 by inserting and shaping the rod 52. The rod 52 integral with the press button 51 is inserted from an opening 3e while the return spring 53 for energizing the buttons in the releasing direction is attached, and is piercing into a through hole 3f on the rear case 3 side in an S-direction. While the rod 52 is piercing into the through hole 3f, an O-ring 55 for sealing inserted in the circular caved portion on the bottom of the opening 3e is pressed by a press washer 54 and is fit into the outer circumference of the rod 52. A stop ring 56 is attached at the contact position of the end surface of the through hole 3f on the case side of the rod 52. The releasing position of the press button 51 is determined by the stop ring 56 while it is energized by the return spring 53. The press button 51 is slidably inserted to the opening 3e. Since an operating portion 51a of the press button 51 is projected from an upper notch portion of the opening 3e, the rotation of the rod 52 is limited.

A gap between the rod 52 and the opening 3e is water-tightened by the O-ring 55 and, simultaneously, the rotation of the rod 52 is slidably limited and the rod 52 is supported. The S-direction for inserting the rod 52 is inclined with a predetermined angle α a in the down direction to the front side of the Z-direction (not in parallel), the roller at the edges of the rod 52 presses the rear portion 62b of the strobe light-emitting portion 62 by pressing the rear portion 62d from the upper diagonal direction. Owing to the angle α, while the strobe light-emitting portion 62 is pressed by rollers 59, an axis direction friction force generated by the rod 52 and through hole 3f is relatively reduced.

The rollers 59 are assembled at the edge portion in the case of the rod 52 which pierces into the through hole 3f. That is, referring to FIGS. 7 and 10, the screw shaft support 57 is fit into a fitting hole 57a and is attached to the edge portion of the rod 52. The pair of rollers 59 fixedly having rubber rollers 59b is rotatably inserted to the outer diameter portion of the pair of screw shafts 58. Screw portions 58b of the pair of screw shafts 58 are screwed, from both sides of the screw shaft support 57, to a screw portion 57b of the screw shaft support 57. In the screwed state, edge portions 58a of the screw shafts 58 are engaged with pin holes 52a of the edge portion of the rod 52. Therefore, the screw shaft support 57 which supports the rollers 59 and the screw shafts 58 are fixed to the edge portion of the rod 52. The pair of rollers 59 having rubber rollers 59b is positioned on the right and left sides in the direction perpendicular to the Z-direction in front of the rod 52 at a predetermined interval, and the rear portion 62b of the strobe light-emitting portion 62 at the pop-up position is supported to be pressed.

A description is given of the pop-up operation and storing operation of the strobe light-emitting portion 62 by using the pop-up member 28 and the restoring member 29 of the light-emitting portion in the waterproof housing 1 with the above-mentioned structure according to the embodiment with reference to FIGS. 11 to 14.

The camera 60 is inserted in the waterproof housing 1, and the front case 2 and the rear case 3 are closed. Further, the camera 60 is stopped and then is stored in the waterproof housing 1 in the sealing state. In the storing state, the camera 60 is operated by using the power switch operating members 26 and 27.

In the camera operating state, the press button 41 of the pop-up member 28 is pressed, thereby pressing the pop-up button 66 of the camera 60 by the edge rubber member 43. Further, the strobe light-emitting portion 62 stands up at the pop-up position (light-emitting position) (refer to FIGS. 11 and 13) and the strobe photographing state is set.

After ending the strobe photographing operation, the strobe light-emitting portion 62 at the pop-up position presses the press button 51 of the restoring member 29 of the light-emitting portion. Then, the rubber rollers 59b attached to the pair of rollers 59 of the restoring member 29 of the light-emitting portion are moved along the S-direction, and the rear portion 62b of the strobe light emitting portion 62 is pressed from the upper diagonal direction and is rotated in the storing direction (refer to FIGS. 12 and 14). When the strobe light-emitting portion 62 reaches the restoring position, it is stopped by the stop member.

In the waterproof housing 1 according to the embodiment, it is possible to rotate and stand up the camera 60 from the restoring position to the pop-up position or to restore the strobe light-emitting portion 62 at the restoring position from the pop-up position by externally pressing the press button of the pop-up member 28 or restoring member 29 of the light emitting portion arranged at the rear portion of the waterproof housing 1.

In particular, the rods 52 for pressing the restoring member 29 of the light-emitting portion are inclined in the Z-direction, namely, in the optical axis O direction of the photographing lens so that it is inclined down at the predetermined angle toward the front side of the direction along the rear portion 62b of the strobe light-emitting portion 62 at the restoring position. Therefore, the rod sliding resistance against the through hole 3f on the case side due to reaction force applied from the rear portion 62b of the strobe light-emitting portion 62 is lower than the case in which the rod 52 are in parallel with the Z-direction, and the rear portion 62b of the strobe light emitting portion 62 can efficiently be pressed.

The pair of the rollers 59 of the restoring member 29 of the light-emitting portion is arranged on the right and left sides of the rods 52, namely, apart from each other by a predetermined distance on the side along the rotating shaft 62a of the strobe main body. Therefore, the rotation force to the rods 52 is lower as compared with the case in which the rollers 59 are arranged only on the single side. Further, the rotation friction force of the press button 51 is lower upon pressing the restoring member 29 of the light-emitting portion and thus the operation becomes smooth.

The present invention is not limited to the above embodiment and can variously be modified without departing from the essentials of the present invention.

What is claimed is:

1. A system having a camera and a waterproof housing, the system comprising:
   the camera comprising
      a strobe light-emitting portion which is rotated to the light-emitting position and the non light-emitting position; and
   the waterproof housing which can store the camera comprising
      a press member which presses the strobe light-emitting portion so that the strobe light-emitting portion is located from the light-emitting position to the non light-emitting position.

2. A system comprising a camera and a waterproof housing according to claim 1, further comprising:
   an operating member which is arranged to the waterproof housing so as to operate a light-emission preparing member provided for the camera for positioning the strobe at the light-emitting position.

3. The system according to claim 1, wherein a portion of the press member is manually operable and exposed to a user.

4. The system according to claim 1, wherein the press member presses an external surface of the strobe-light emitting portion.

5. A waterproof housing comprising:
   a waterproof housing case member which can store a camera having a strobe light-emitting portion that is rotated to the light-emitting position and the non light-emitting position, the strobe light-emitting portion having a front portion and a rear portion; and
   a press member which presses the strobe light-emitting portion from the rear portion so as to locate the strobe light-emitting portion from the light-emitting position to the non light-emitting position.

6. A waterproof housing according to claim 5, further comprising:

an operating member which is arranged to the waterproof housing so as to operate a light-emission preparing member provided for the camera for positioning the strobe light-emitting portion at the light-emitting position.

7. A waterproof housing according to claim 5, wherein the press member comprises a rotatable roller.

8. A waterproof housing according to claim 5, wherein the press means comprises:

a shaft member which is piercing through the inside and outside of the waterproof housing and can be moved in the shaft direction; and a roller which can be rotated at the edge of the shaft member in the waterproof housing, and the roller presses the strobe light-emitting portion.

9. A waterproof housing according to claim 8, wherein the shaft member is arranged, not in parallel with an optical axis of a photographing lens of the camera.

10. A waterproof housing according to claim 8, wherein the shaft member is arranged at the position for applying rotation moment in the rotation center of the strobe light-emitting portion in the camera.

11. A waterproof housing according to claim 8, wherein the roller comprises a pair of rollers which sandwiches the core of the shaft member.

12. The waterproof housing according to claim 5, wherein a portion of the press member is manually operable and exposed to a user.

13. The waterproof housing according to claim 5, wherein the press member presses an external surface of the strobe-light emitting portion.

14. A waterproof housing comprising:

a waterproof housing case member which can store a camera having a strobe light-emitting portion that is rotated to the light-emitting position and the non light-emitting position, the strobe light-emitting portion having a front portion and a rear portion; and a press member which presses the strobe light-emitting portion from the rear portion so as to locate the strobe light-emitting portion from the light-emitting position to the non light-emitting position.

15. A waterproof housing according to claim 14, further comprising:

an operating member which is positioned on the waterproof housing so as to operate a light-emission preparing member provided for the camera for positioning the strobe light-emitting portion at the light-emitting position.

16. A waterproof housing according to claim 14, wherein the press member comprises a rotatable roller.

17. The waterproof housing according to claim 14, wherein a portion of the press member is manually operable and exposed to a user.

18. The waterproof housing according to claim 14, wherein the press member presses an external surface of the strobe-light emitting portion.

* * * * *